(12) United States Patent
Diamond

(10) Patent No.: US 6,509,081 B1
(45) Date of Patent: Jan. 21, 2003

(54) NO-SEPTUM ACOUSTIC SANDWICH PANEL, AND APPARATUS AND METHOD FOR SUPPRESSING NOISE IN A NOZZLE

(75) Inventor: John Anthony Diamond, Kenmore, WA (US)

(73) Assignee: The Boeing Company, Seattle, WA (US)

(*) Notice: Subject to any disclaimer, the term of this patent is extended or adjusted under 35 U.S.C. 154(b) by 63 days.

(21) Appl. No.: 09/672,480

(22) Filed: Sep. 28, 2000

(51) Int. Cl.[7] .............................. B32B 3/12; B32B 3/04
(52) U.S. Cl. .................... 428/131; 428/138; 428/139; 428/116; 428/117; 428/118
(58) Field of Search ................... 428/138, 139, 428/116, 117, 118, 131

(56) References Cited

U.S. PATENT DOCUMENTS

| | | | |
|---|---|---|---|
| 3,502,171 A | | 3/1970 | Cowan |
| 3,647,021 A | * | 3/1972 | Millman et al. ....... 181/33 HC |
| 3,819,007 A | | 6/1974 | Wirt et al. |
| 3,821,999 A | | 7/1974 | Guess et al. |
| 4,001,473 A | | 1/1977 | Cook |
| 4,111,081 A | | 9/1978 | Hilliard et al. |
| 4,235,303 A | | 11/1980 | Dhoore et al. |
| 4,254,171 A | | 3/1981 | Beggs et al. |
| 4,257,998 A | | 3/1981 | Diepenbrock, Jr. et al. |
| 4,265,955 A | | 5/1981 | Harp et al. |
| 4,291,080 A | | 9/1981 | Ely et al. |
| 4,292,356 A | | 9/1981 | Whitmore et al. |
| 4,384,020 A | | 5/1983 | Beggs et al. |
| 4,421,201 A | | 12/1983 | Nelsen et al. |
| 4,433,021 A | | 2/1984 | Riel |
| 4,522,859 A | * | 6/1985 | Blair ..................... 428/116 |
| 4,539,244 A | | 9/1985 | Beggs et al. |
| 4,600,619 A | | 7/1986 | Chee et al. |
| 4,990,391 A | * | 2/1991 | Veta et al. .............. 428/116 |
| 5,151,311 A | | 9/1992 | Parente et al. |
| 5,180,619 A | | 1/1993 | Landi et al. |
| 5,445,861 A | | 8/1995 | Newton et al. |
| 5,912,442 A | * | 6/1999 | Nye et al. .............. 181/292 |

FOREIGN PATENT DOCUMENTS

| | | |
|---|---|---|
| DE | 41 31 394 A1 | 4/1993 |
| DE | 44 22 585 C1 | 10/1995 |
| EP | 0 352 993 A1 | 1/1990 |
| FR | 2 710 874 A1 | 4/1995 |
| FR | 2 735 064 A1 | 12/1996 |
| GB | 2 122 540 A | 1/1984 |
| GB | 2 252 077 A | 7/1992 |

OTHER PUBLICATIONS

James P. Woolsey, U.S. SST Drive Advances, Air Transport World, Jun. 1996, pp. 157 and 158, Penton Publishing, Cleveland Ohio.

William Herkes, Acoustic and Aerothermal Performance Test of the Near–fully Mixed Nozzle, Oct. 1995, pp. 1–91, vol. II—Acoustic Performance, National Aeronautics and Space Administration (NASA), Seattle, Washington.

* cited by examiner

*Primary Examiner*—Harold Pyon
*Assistant Examiner*—Patricia L. Nordmeyer
(74) *Attorney, Agent, or Firm*—Alston & Bird LLP

(57) ABSTRACT

An acoustic panel comprises a core layer of honeycomb whose opposite sides are covered by face sheets each comprising a perforated metal plate and a sheet of metal cloth such as woven wire or metal felt. The perforated metal plates are bonded to the core and the metal cloth sheets form the outer surfaces of the panel. Each metal cloth sheet has an acoustic resistance of 5 to 300 Rayls. The perforated metal plates have an open area of about 20 to 40 percent in preferred embodiments. Noise in a nozzle is suppressed by disposing a plurality of the acoustic panels in the nozzle duct with the panels oriented radially and spaced apart about a circumference of the duct.

21 Claims, 3 Drawing Sheets

NO-SEPTUM ACOUSTIC SANDWICH PANEL, AND APPARATUS AND METHOD FOR SUPPRESSING NOISE IN A NOZZLE

FIELD OF THE INVENTION

The present invention relates to sandwich panels for attenuating acoustic energy. The invention relates more particularly to such panels designed for use as acoustic liners or splitters for suppressing jet mixing noise and/or turbomachinery noise, such as in a fan duct of a turbofan aircraft engine.

BACKGROUND OF THE INVENTION

The noise generated by aircraft engines can be a nuisance to passengers and to people on the ground in the vicinity of airports. Many governments as well as airports and other noise-controlled areas impose strict limits on the level of noise that aircraft are permitted to generate. Generally, in order to meet such regulations, various types of noise suppression devices must be used for suppressing the noise generated by the aircraft engines. For example, in turbofan or turbojet engines it is common to line at least portions of the engine nacelle and/or nozzle duct with acoustic panels for suppressing noise. Such acoustic panels in some cases are designed to suppress noise generated by sources on either side of the panel.

A prior acoustic panel for such applications is formed by a plate or septum having a honeycomb layer bonded to each of the opposite sides of the septum. Each honeycomb layer is covered at its outer surface by a perforated metal plate. Exemplary acoustic panels of this type are described, for example, in U.S. Pat. Nos. 4,265,955 and 4,257,998.

The present invention seeks to provide an acoustic panel providing at least as good attenuation as the above-mentioned type of panel with the least possible weight and performance penalties when used in an aircraft engine or similar application.

SUMMARY OF THE INVENTION

The invention provides an acoustic sandwich panel that achieves substantially the same jet noise suppression as the known panel described above, but is significantly thinner and lighter in weight than the known panel. This is accomplished, in accordance with one preferred embodiment of the invention, by constructing the core of the panel from a porous material such as honeycomb without any septum. The porous core can have a substantially smaller thickness than the combined thickness of the two honeycomb layers and septum in the known panel. A face sheet is attached to each of the opposite faces of the core. The face sheets at their outer surfaces include a layer of fibrous cloth such as metal felt or woven wire. In a particularly preferred embodiment, each face sheet comprises a perforated metal plate bonded to a sheet of metal cloth. The perforated plates are attached to the core and the metal cloth sheets form the outer surfaces of the acoustic panel. The perforated plates provide structural rigidity to the panel, and preferably have a relatively large open area so as to have a relatively small acoustic effect compared to the metal cloth sheets. Viscous losses through the metal cloth sheets provide dissipation of the acoustic energy.

In attempts prior to the present invention to construct a no-septum acoustic panel, the panel was formed by a honeycomb core with perforated metal plates attached to the opposite sides of the core so as to form the outer surfaces of the panel. Tests performed on such no-septum panels showed that the attenuation performance was worse than the conventional panel with septum.

The development of the present invention ran counter to the accepted wisdom that no-septum acoustic panels were disadvantageous from the standpoint of acoustic attenuation performance. It was discovered that by including the outer layers of metal cloth, the acoustic attenuation of the panel can be essentially the same as that of the conventional panel having a septum. However, the panel's thickness and weight can be substantially less than that of the conventional panel. When used in applications in which flow occurs on both sides of the panel such as in a turbofan engine fan duct, the panel of the invention enables substantial reduction in the blockage presented by the panel, which is beneficial to the aerodynamic performance of the engine. The lower weight of the panel is also desirable in aircraft applications.

The invention also encompasses apparatus and methods for suppressing noise in a nozzle. In accordance with the invention, suppressing noise in a nozzle is accomplished by disposing at least one splitter in the duct of the nozzle such that flow occurs along both sides of the splitter. The splitter comprises a core layer having opposite faces, the core layer being a porous material, and a pair of face sheets attached to the opposite faces of the core layer so as to sandwich the core layer therebetween, each face sheet including at least a sheet of fibrous cloth defining an outer surface of the face sheet. In a preferred embodiment of the invention, a plurality of such splitters are disposed in the nozzle duct, the splitters being oriented generally radially and spaced apart circumferentially in the duct.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 4A is a cross-sectional view of the nozzle along the line 4A—4A of FIG. 4;

FIG. 4B is a cross-sectional view of the nozzle along the line 4B—4B of FIG. 4;

FIG. 4C is a cross-sectional view of the nozzle along the line 4C—4C of FIG. 4.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
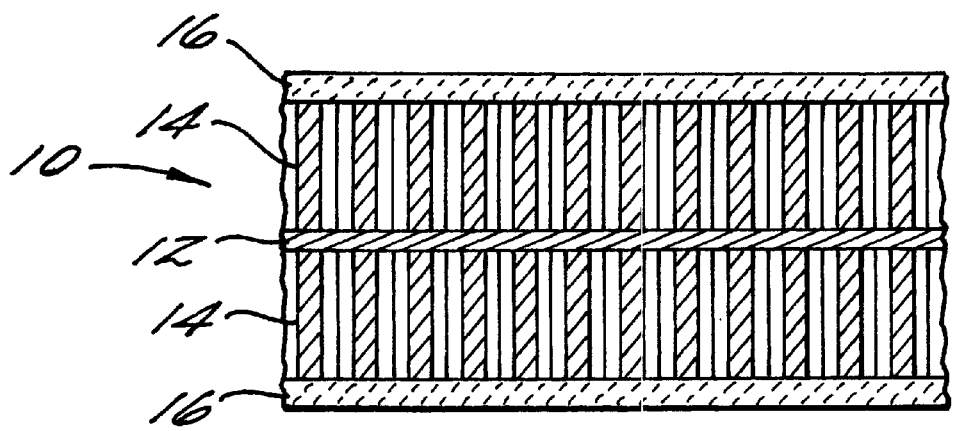
FIG. 1 is a schematic cross-sectional view of a prior acoustic panel having a septum.

FIG. 1 shows a prior acoustic panel 10 such as disclosed in U.S. Pat. Nos. 4,265,955 and 4,257,998. The panel 10 includes a solid plate or septum 12, a layer of honeycomb material 14 bonded to each of the opposite faces of the septum 12, and a face sheet 16 bonded to the outer surface of each honeycomb layer 14. Each face sheet 16 comprises a perforated plate.

Figure 2:
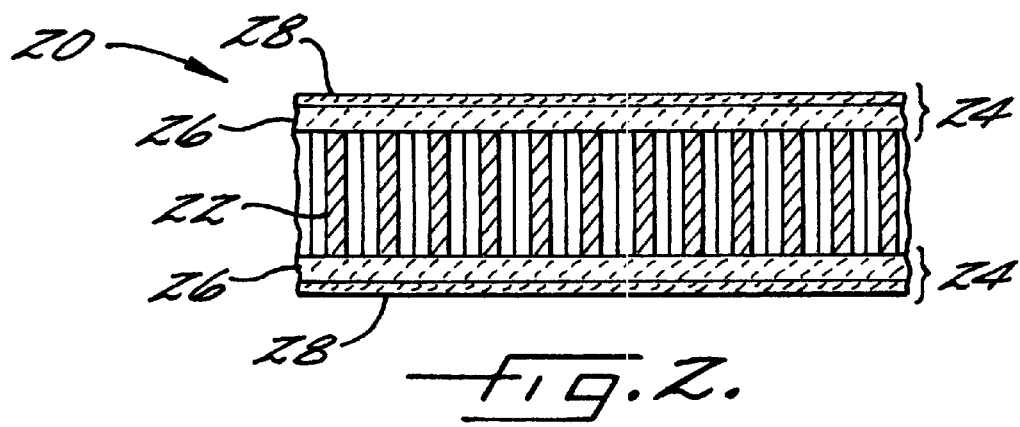
FIG. 2 is a schematic cross-sectional view of an acoustic panel in accordance with one preferred embodiment of the invention.

FIG. 2 depicts an acoustic panel 20 in accordance with the present invention. The panel 20 includes a core layer 22 of porous material such as honeycomb, and a pair of face sheets 24 bonded to each of the opposite faces of the core layer 22. The core layer 22 includes a plurality of through openings that extend from one face of the core layer to the opposite face thereof. Thus, in the illustrated preferred embodiment where the core layer 22 is a honeycomb material, the cells of the honeycomb define the through openings. Alternatively, the core layer 22 can comprise a porous bulk absorber material having pores that communicate from one face of the core layer to the other.

Each face sheet 24 comprises a perforated plate 26 and a porous sheet 28 of fibrous cloth. In the preferred embodiment, the sheets 28 comprise metal cloth, but in some applications it may be possible to form the sheets 28 from a material other than metal. A suitable metal cloth can be, for example, a woven wire material or a metal felt material. The porous fibrous sheets 28 are characterized by a multiplicity of small holes defined between the fibers of the sheets. These holes communicate with the perforations in the perforated plates 26, which in turn communicate with the cells or through openings of the core layer 22.

Generally, the thickness of the core layer 22 will be greater than that of a face sheet 24. The thickness and other physical characteristics of each of the various layers of the panel 20 are generally dependent on the acoustic, strength, and weight objectives for the panel. It is frequently desired to "tune" the panel to provide noise attenuation at a particular frequency or over a particular range of frequencies. As known in the art, where a honeycomb core layer is used in an acoustic panel, the sizes of the cells can be selected to tune the core layer to a particular frequency or range of frequencies. With regard to the perforated plates 26, their primary function is to provide structural rigidity to the panel 20, and hence the thickness and percent open area of the perforated plates 26 must be selected so as to achieve the desired strength for the panel. As a general rule, it is desirable for the perforated plates 26 to have as large an open area as can be tolerated from a strength standpoint so that the plates 26 will have a relatively small acoustic effect in comparison with that of the fibrous sheets 28. For example, the plates 26 can have about a 20 percent to about 40 percent open area. It will also be appreciated that where the desired strength of the panel can be achieved with the core layer 22 and fibrous sheets 28 alone, the perforated plates 26 can be omitted and the fibrous sheets 28 can be directly bonded to the core layer 22.

The panel 20 is formed by suitably bonding the various layers to one another. This can be accomplished by welding or brazing the layers together where they are constructed of metal. Alternatively, such metal layers can be attached together by a sintering type technique in which the layers are assembled together and the assembly is placed in an oven to heat the assembly while pressure is applied to the assembly. A still further alternative is to join the layers together with a suitable adhesive.

The fibrous sheets 28 provide noise attenuation through viscous losses that occur through the sheets. The optimum or advantageous acoustic resistance of the fibrous sheets 28 in general is a function of the flow dynamic, thermodynamic, fluid, and material properties. Mathematical modeling of the acoustic panel 20 for a high-Mach number, high-pressure, and high-temperature flow suggests that relatively low acoustic resistance for each of the sheets 28 is desirable, for example, about 10 Rayls at 20 cm/sec. In other applications, the optimum acoustic resistance of each of the fibrous sheets 28 may be different, but it is expected that in general an optimum acoustic resistance for most applications will be from about 5 Rayls to about 300 Rayls at 20 cm/sec.

The present invention was developed in conjunction with development activities on the High Speed Civil Transport (HSCT) project conducted in cooperation with NASA. One concept for the propulsion package for the HSCT utilizes turbojet engines that are fitted with mixer-ejector nozzles for attenuating noise associated with the mixing of the engine exhaust plumes. The assignee of the present application has developed a near-fully mixed (NFM) nozzle for application to the HSCT. It is contemplated that the NFM nozzle will require acoustic treatment in order to meet overall noise goals for the propulsion package.

Accordingly, the panel of the present invention was developed for placement in the NFM nozzle duct. An experimental test program was conducted to determine the noise attenuation performance of several configurations of acoustic treatment. One of the objectives of the test was to compare the noise attenuation performance of conventional acoustic panels having a septum to that of the no-septum panels of the present invention.

Figure 4:
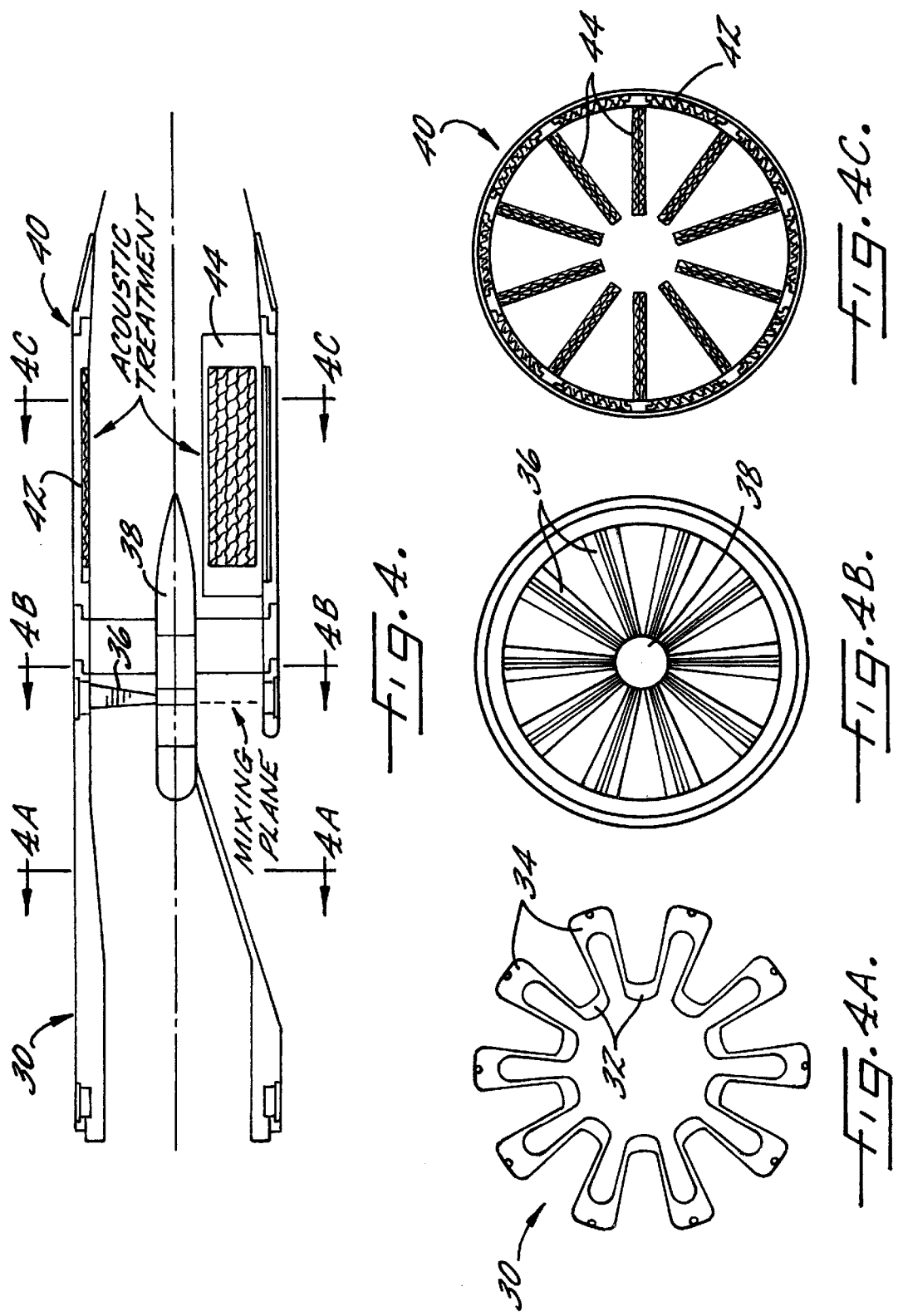
FIG. 4 is a cross-sectional view of the nozzle used in the series of tests.

FIG. 4 shows a cross-sectional view of the NFM nozzle test model. The NFM nozzle includes a lobed aspirator section 30 having a plurality of full-penetration, aspirated flow passages 32 spaced circumferentially around the nacelle and alternating with primary flow passages 34, as best seen in the cross-sectional view of FIG. 4A. The inlets to the aspirated flow passages 32 are flush with the outer nacelle. Under takeoff and landing operating conditions of the actual engine, the aspirated flow passages 32 would be open when noise suppression is desired, and at other conditions the inlets to these passages could be closed by inlet doors (not shown). The exits of the primary flow passages 34 resemble a plurality of rectangular plug nozzles each having a radial strut/plug 36 located directly behind the flow passage 34. The nozzle flow passages are convergent-divergent as a result of the wedge-shaped contour of the plugs 36. The plugs 36 are pinned to a centerbody 38.

The NFM nozzle also includes a mixing nozzle 40 in which acoustic treatment is incorporated. The mixing nozzle 40 includes an outer shroud 42 of generally cylindrical form and a plurality of circumferentially spaced radial splitters 44 that extend radially inwardly from the shroud 42. As further explained below, in the series of tests acoustic panels were applied to the shroud 42 alone, the splitters 44 alone, and to both the shroud and the splitters, to determine the effect on noise attenuation of treating the shroud and/or splitters.

The NFM nozzle was tested in Boeing's Low-Speed Aeroacoustic Facility (LSAF) consisting of a free-jet wind tunnel having its test section in an anechoic chamber. The chamber was fitted with a pair of traversing near-sideline microphones and with 16 pole-mounted far-sideline microphones.

Figure 3:
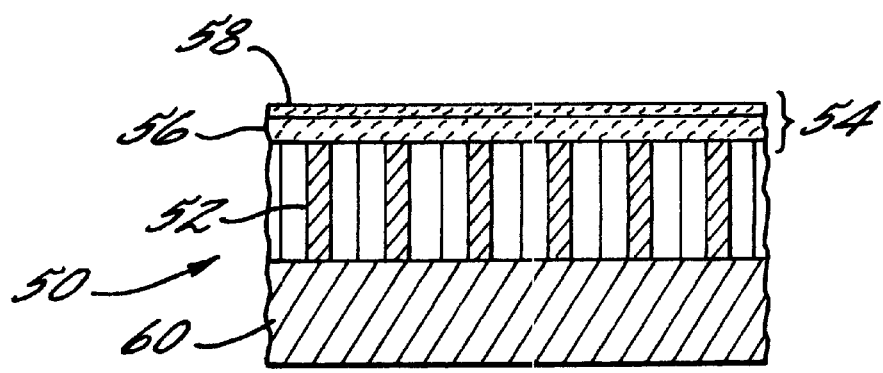
FIG. 3 is a schematic cross-sectional view of an acoustic panel for treating a shroud of a mixer nozzle for a series of tests conducted to assess the effectiveness of acoustic treatment in accordance with the invention.

Various configurations were tested. One configuration had a hardwall shroud 42 and hardwall splitters 44. Another configuration had hardwall splitters 44 but the shroud 42 was treated with an acoustic panel 50 as shown in FIG. 3. The shroud panel 50 comprised a honeycomb core 52 with a face sheet 54 on one side thereof formed of a perforated plate 56 and a metal cloth sheet 58, and a solid backing sheet 60 on the opposite side of the core 52. The thickness of the core 52 was 0.15 inch, that of the face sheet 54 was 0.03 inch, and that of the backing sheet 60 was 0.15 inch. The face sheet 54 formed the surface of the shroud panel 50 that faced into the nozzle. The perforated plate 56 had a 31 percent open area with holes of 0.055 inch diameter. The metal cloth sheet 58 comprised a woven wire having an acoustic resistance of 10 Rayls at 20 cm/sec, with a 2.6 non-linearity factor measured at an airflow of 200 cm/sec versus 20 cm/sec.

Another tested configuration had a treated shroud as described above, but the splitters 44 were omitted. Yet another configuration had a treated shroud, and splitters 44 formed by conventional acoustic panels 10 having a solid septum as shown in FIG. 1. The thickness of each of the honeycomb core layers 14 was 0.15 inch, and the perforated plates 16 each had a 31 percent open area with 0.055 inch diameter holes. The core layers 14 had honeycomb cells of ⅛-inch diameter.

A final configuration tested had a treated shroud, and splitters 44 formed by acoustic panels 20 in accordance with the invention as shown in FIG. 2. The core 22 was a honeycomb of 0.15 inch thickness with ⅛-inch diameter cells (i.e., identical to one of the honeycomb layers 14 of the conventional panel with septum). The face sheets 24 comprised perforated plates 26 having a 31 percent open area with 0.055 inch diameter holes, and metal cloth sheets 28 comprising a woven wire with an acoustic resistance of 10 Rayls at 20 cm/sec, with a 2.6 non-linearity factor measured at an airflow of 200 cm/sec versus 20 cm/sec.

Figure 5:
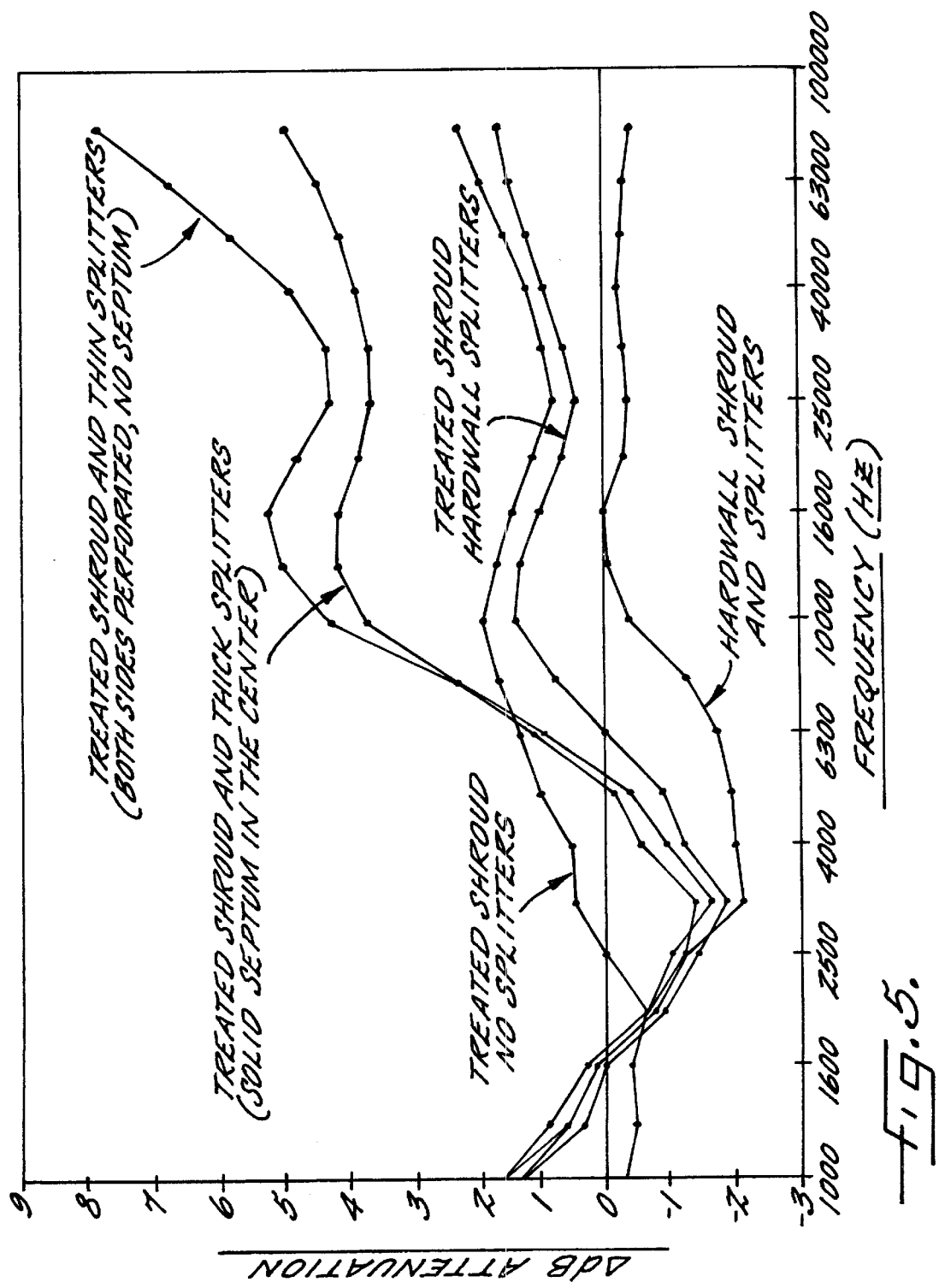
FIG. 5 is a plot of test results comparing the noise attenuation achieved for the nozzle with various configurations of acoustic treatment.

FIG. 5 depicts test results for all of these various nozzle configurations. The noise attenuation relative to a baseline configuration (hardwall shroud with no splitters) is plotted as a function of frequency for a location 90° from the longitudinal axis of the nozzle. Of particular note is the fact that the thin splitters designed in accordance with the invention provide greater noise attenuation than that provided by the thick splitters having a septum. The thin splitters also provide the additional benefits of presenting significantly less blockage than the thick splitters and being substantially lighter in weight than the thick splitters. It will also be noted that disposing treated splitters in the nozzle duct provides a noise attenuation benefit relative to the configuration without splitters.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An acoustic sandwich panel for attenuating flow field noise in a flow field wherein flow occurs over both sides of the panel, the panel attenuating flow field noise from both sides of the panel, comprising:
    a core layer of honeycomb with opposite faces and defining a plurality of through openings extending between said opposite faces; and
    a pair of face sheets attached to the opposite faces of the core layer so as to sandwich the core layer therebetween, each face sheet including at least a sheet of fibrous cloth defining an outer surface of the face sheet, each sheet of fibrous cloth defining a multiplicity of holes in connection with the through openings of the core, the sheets of fibrous cloth providing acoustic attenuation via viscous losses through said sheets.

2. The acoustic sandwich panel of claim 1, wherein each face sheet further comprises a structural layer that is bonded to the core for providing structural rigidity to the panel, the structural layers having openings extending through the thickness thereof and being configured to have a relatively small acoustic effect compared to that of the sheets of fibrous cloth.

3. The acoustic sandwich panel of claim 2, wherein the structural layers comprise perforated metal plates.

4. The acoustic sandwich panel of claim 1, wherein the honeycomb is formed of metal.

5. The acoustic sandwich panel of claim 1, wherein the cloth sheets comprise sheets of woven wire.

6. The acoustic sandwich panel of claim 1, wherein the cloth sheets comprise sheets of metal felt.

7. The acoustic sandwich panel of claim 1, wherein each cloth sheet has an acoustic resistance of about 5 to 300 Rayls.

8. An acoustic sandwich panel for attenuating flow field noise in a flow field wherein flow occurs over both sides of the panel, the panel attenuating flow field noise from both sides of the panel, comprising:
    a core layer of metal honeycomb material with opposite faces, the core layer defining a plurality of through openings extending between said opposite faces; and
    a pair of face sheets attached to the opposite faces of the core layer so as to sandwich the core layer therebetween, each face sheet including a perforated metal plate bonded to the core layer and a sheet of metal cloth attached to an outer surface of the perforated plate, the perforated plates defining openings therethrough and the sheets of metal cloth defining a multiplicity of holes therethrough in connection with the through openings of the core, the sheets of metal cloth providing acoustic attenuation via viscous losses through said sheets.

9. The acoustic sandwich panel of claim 8, wherein each perforated metal plate has an open area of about 20 to 40 percent.

10. The acoustic sandwich panel of claim 8, wherein each metal cloth sheet has an acoustic resistance of about 5 to 300 Rayls.

11. The acoustic sandwich panel of claim 8, wherein the metal cloth sheets comprise sheets of woven wire.

12. The acoustic sandwich panel of claim 8, wherein the metal cloth sheets comprise sheets of metal felt.

13. An apparatus for suppressing noise in a nozzle having a duct, comprising:
    a plurality of radial splitters disposed in the duct spaced about a circumference thereof, each radial splitter comprising:

a core layer of honeycomb, with opposite faces, the core layer defining a plurality of through openings extending between said opposite faces; and a pair of face sheets attached to the opposite faces of the core layer so as to sandwich the core layer therebetween, each face sheet including at least a sheet of fibrous cloth defining an outer surface of the face sheet, each sheet of fibrous cloth defining a multiplicity of holes in connection with the through openings of the core, the sheets of fibrous cloth providing acoustic attenuation via viscous losses through said sheets.

14. The apparatus of claim 13, wherein each face sheet further comprises a structural layer that is bonded to the core for providing structural rigidity to the panel, the structural layers having openings extending through the thickness thereof and being configured to have a relatively small acoustic effect compared to that of the sheets of fibrous cloth.

15. The apparatus of claim 14, wherein the structural layers comprise perforated metal plates.

16. The apparatus of claim 13, wherein the honeycomb is formed of metal.

17. The apparatus of claim 13, wherein the cloth sheets comprise sheets of woven wire.

18. The apparatus of claim 13, wherein the cloth sheets comprise sheets of metal felt.

19. A method for suppressing noise in a duct of a nozzle, comprising:

disposing at least one panel-shaped splitter in the duct such that flow occurs over both of two opposite faces of the splitter, the splitter comprising:

a core layer with opposite faces, the core layer comprising honeycomb defining a plurality of through openings extending between said opposite faces of the core layer; and a pair of face sheets attached to the opposite faces of the core layer so as to sandwich the core layer therebetween, each face sheet including at least a sheet of fibrous cloth defining an outer surface, of the face sheet, each sheet of fibrous cloth defining a multiplicity of holes in connection with the through openings of the core, the sheets of fibrous cloth providing acoustic attenuation via viscous losses through said sheets, whereby the splitter attenuates flow field noise from both sides of the splitter.

20. The method of claim 19, wherein the splitter is oriented generally radially in the duct.

21. The method of claim 20, wherein a plurality of said splitters are disposed in the duct so as to be oriented generally radially and spaced apart circumferentially.

\* \* \* \* \*

UNITED STATES PATENT AND TRADEMARK OFFICE
CERTIFICATE OF CORRECTION

PATENT NO. : 6,509,081 B1
DATED : January 21, 2003
INVENTOR(S) : Diamond

It is certified that error appears in the above-identified patent and that said Letters Patent is hereby corrected as shown below:

Title page,
Item [*] Notice, should read -- Subject to any disclaimer, the term of this patent is extended or adjusted under 35 U.S.C. 154(b) by 0 days. --

Signed and Sealed this

Twenty-eighth Day of September, 2004

JON W. DUDAS
*Director of the United States Patent and Trademark Office*